United States Patent
Yoshimine et al.

(10) Patent No.: US 9,673,466 B2
(45) Date of Patent: Jun. 6, 2017

(54) FUEL CELL MODULE

(71) Applicant: HONDA MOTOR CO., LTD., Tokyo (JP)

(72) Inventors: Yuki Yoshimine, Wako (JP); Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/784,166

(22) PCT Filed: Mar. 14, 2014

(86) PCT No.: PCT/JP2014/057943
§ 371 (c)(1),
(2) Date: Oct. 13, 2015

(87) PCT Pub. No.: WO2014/171263
PCT Pub. Date: Oct. 23, 2014

(65) Prior Publication Data
US 2016/0079622 A1 Mar. 17, 2016

(30) Foreign Application Priority Data

Apr. 18, 2013 (JP) .................................. 2013-087803

(51) Int. Cl.
*H01M 8/06* (2016.01)
*H01M 8/0612* (2016.01)
(Continued)

(52) U.S. Cl.
CPC ............. *H01M 8/0618* (2013.01); *C01B 3/38* (2013.01); *H01M 8/04022* (2013.01);
(Continued)

(58) Field of Classification Search
None
See application file for complete search history.

(56) References Cited

U.S. PATENT DOCUMENTS 6,379,829 B1 4/2002 Kurita
6,531,102 B1 3/2003 Nakamura et al.
(Continued)

FOREIGN PATENT DOCUMENTS

JP 2001-236980 8/2001
JP 2004-059415 2/2004
(Continued)

OTHER PUBLICATIONS

This case is co-pending with U.S. Appl. No. 14/784,183, filed Oct. 13, 2015 and U.S. Appl. No. 14/784,189, filed Oct. 13, 2015.
(Continued)

*Primary Examiner* — Patrick Ryan
*Assistant Examiner* — Wyatt McConnell
(74) *Attorney, Agent, or Firm* — Rankin, Hill & Clark LLP

(57) ABSTRACT

A fuel cell module includes a first area where an exhaust gas combustor and a start-up combustor are provided, a second area where a reformer and a heat exchanger are provided, and a third area where an evaporator is provided. A stress relaxing portion for relaxing heat stress is provided at least along a border between the first area and the second area, along a border between the second area and the third area, or along an outermost portion of the third area.

9 Claims, 16 Drawing Sheets

(51) Int. Cl.
*H01M 8/04014* (2016.01)
*H01M 8/04119* (2016.01)
*H01M 8/04223* (2016.01)
*C01B 3/38* (2006.01)
*H01M 8/243* (2016.01)
*H01M 8/124* (2016.01)

(52) U.S. Cl.
CPC ... *H01M 8/04126* (2013.01); *H01M 8/04223* (2013.01); *H01M 8/0631* (2013.01); *H01M 8/243* (2013.01); *C01B 2203/066* (2013.01); *C01B 2203/067* (2013.01); *C01B 2203/1247* (2013.01); *H01M 8/04268* (2013.01); *H01M 2008/1293* (2013.01); *H01M 2300/0074* (2013.01); *Y02E 60/566* (2013.01)

(56) References Cited

U.S. PATENT DOCUMENTS

| | | | |
|---|---|---|---|
| 9,406,950 | B2 | 8/2016 | Ogawa et al. |
| 2001/0009732 | A1 | 7/2001 | Schuter |
| 2009/0208800 | A1 | 8/2009 | Ogawa |
| 2010/0021784 | A1 | 1/2010 | Fourmigue |
| 2015/0280263 | A1 | 10/2015 | Yoshimine |
| 2015/0295259 | A1 | 10/2015 | Yoshimine |

FOREIGN PATENT DOCUMENTS

| | | |
|---|---|---|
| JP | 2004-288434 | 10/2004 |
| JP | 2008-063193 | 3/2008 |
| JP | 2010-504607 | 2/2010 |
| JP | 2014-096206 | 5/2014 |
| WO | 2013/114773 A1 | 8/2013 |
| WO | 2013/114775 A1 | 8/2013 |
| WO | 2013/187153 A1 | 12/2013 |
| WO | 2013/187154 A1 | 12/2013 |

OTHER PUBLICATIONS

International Search Report, Date of mailing: Dec. 6, 2014.
U.S. Office Action dated Mar. 13, 2017, issued in co-pending U.S. Appl. No. 14/784,189, filed Oct. 13, 2015, 32 pages.

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. An anode is provided on one side of the solid electrolyte, and a cathode is provided on the other side of the solid electrolyte to form an electrolyte electrode assembly (MEA). The electrolyte electrode assembly is sandwiched between separators (bipolar plates) to form a fuel cell. In use, generally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as the conventional technique 1) is known. As shown in FIG. 14, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to induce partial oxidation reforming, and then, the fuel is supplied to the fuel cell stack 1a.

Further, as shown in FIG. 15, a solid oxide fuel cell disclosed in Japanese Laid-Open Patent Publication No. 2010-504607 (PCT) (hereinafter referred to as the conventional technique 2) has a heat exchanger 2b including a cell core 1b. The heat exchanger 2b heats the cathode air utilizing waste heat.

Further, as shown in FIG. 16, a fuel cell system disclosed in Japanese Laid-Open Patent Publication No. 2004-288434 (hereinafter referred to as the conventional technique 3) includes a first area 1c having a cylindrical shape extending vertically, an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, at the time of reforming by partial oxidation in the reaction device 4a, heat of the exhaust gas is used for heating the liquid fuel and the oxygen carrier gas. Therefore, the quantity of heat energy for heating the oxygen-containing gas supplied to the fuel cell stack 1a tends to be insufficient, and the efficiency is low.

Further, temperature distribution tends to be non-uniform in the reaction device 4a due to the heat of the exhaust gas. Thus, in the case where attempts are made to improve the heat exchange efficiency, great temperature differences occur in the vertical direction or in the lateral direction to cause the heat stress. Accordingly, the durability is degraded.

Further, in the conventional technique 2, long flow channels are adopted to have the sufficient heat transmission area. Therefore, considerably large pressure losses tend to occur. Further, since the heat exchanger 2b containing the cell core 1b is provided, temperature distribution tends to be non-uniform in the fuel cell. Thus, in the case where attempts are made to improve the heat exchange efficiency, great temperature differences occur in the vertical direction or in the lateral direction to cause the heat stress. Accordingly, the durability is degraded.

Further, in the conventional technique 3, radiation of the heat from the central area having the highest temperature is suppressed using heat insulation material (partition wall). Therefore, heat cannot be collected (recovered), and the efficiency is low.

Further, the first area 1c where the burner 5c is provided, the second area 2c where the reforming pipe 6c is provided, the third area 3c where the water evaporator 7c is provided, and the fourth area 4c where the CO shift converter 8c is provided are formed concentrically and circumferentially, and temperature distribution tends to be non-uniform in the fuel cell. Thus, in the case where attempts are made to improve the heat exchange efficiency, large temperature differences occur in the vertical direction (axial direction) or in the lateral direction (radial direction) to cause the heat stress. Accordingly, the durability is degraded.

The present invention has been made to solve the problems of this type, and an object of the present invention is to provide a fuel cell module having simple and compact structure in which it is possible to achieve improvement in the heat efficiency and facilitate thermally self-sustaining operation, thereby for improving the durability.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of a raw fuel chiefly containing hydrocarbon and water vapor to produce the fuel gas supplied to the fuel cell stack, an evaporator for evaporating water, and supplying the water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area and where the reformer and the heat exchanger are provided, and an annular third area around the second area and where the evaporator is provided.

Further, a stress relaxing portion for relaxing heat stress is provided at least along a border between the first area and the second area, along a border between the second area and the third area, or along the outermost portion of the third area.

In the present invention, the first area in which the exhaust gas combustor and the start-up combustor are provided is positioned at the center. The annular second area is provided around the first area, and the annular third area is provided around the second area, successively. The reformer and the heat exchanger are provided in the second area, and the evaporator is provided in the third area.

In the structure, generation of the waste heat and heat radiation are suppressed suitably, improvement in the heat efficiency is achieved, and thermally self-sustaining operation can be facilitated. Further, simple and compact structure of the fuel cell module as a whole can be achieved. Thermally self-sustaining operation herein means operation where the operating temperature of the fuel cell is maintained using only heat energy generated in the fuel cell itself, without supplying additional heat from the outside.

Moreover, the stress relaxing portion for relaxing heat stress is provided at least along the border between the first area and the second area, along the border between the second area and the third area, or along the outermost portion of the third area. In the structure, when the FC peripheral equipment including the exhaust gas combustor, the start-up combustor, the reformer, the heat exchanger, and the evaporator are expanded by heat, the heat stress applied to these components in the radial direction and the axial direction is relaxed by the stress relaxing portion. Accordingly, it becomes possible to suitably suppress degradation in the durability of the FC peripheral equipment due to heat stress.

DESCRIPTION OF EMBODIMENTS

Figure 1:
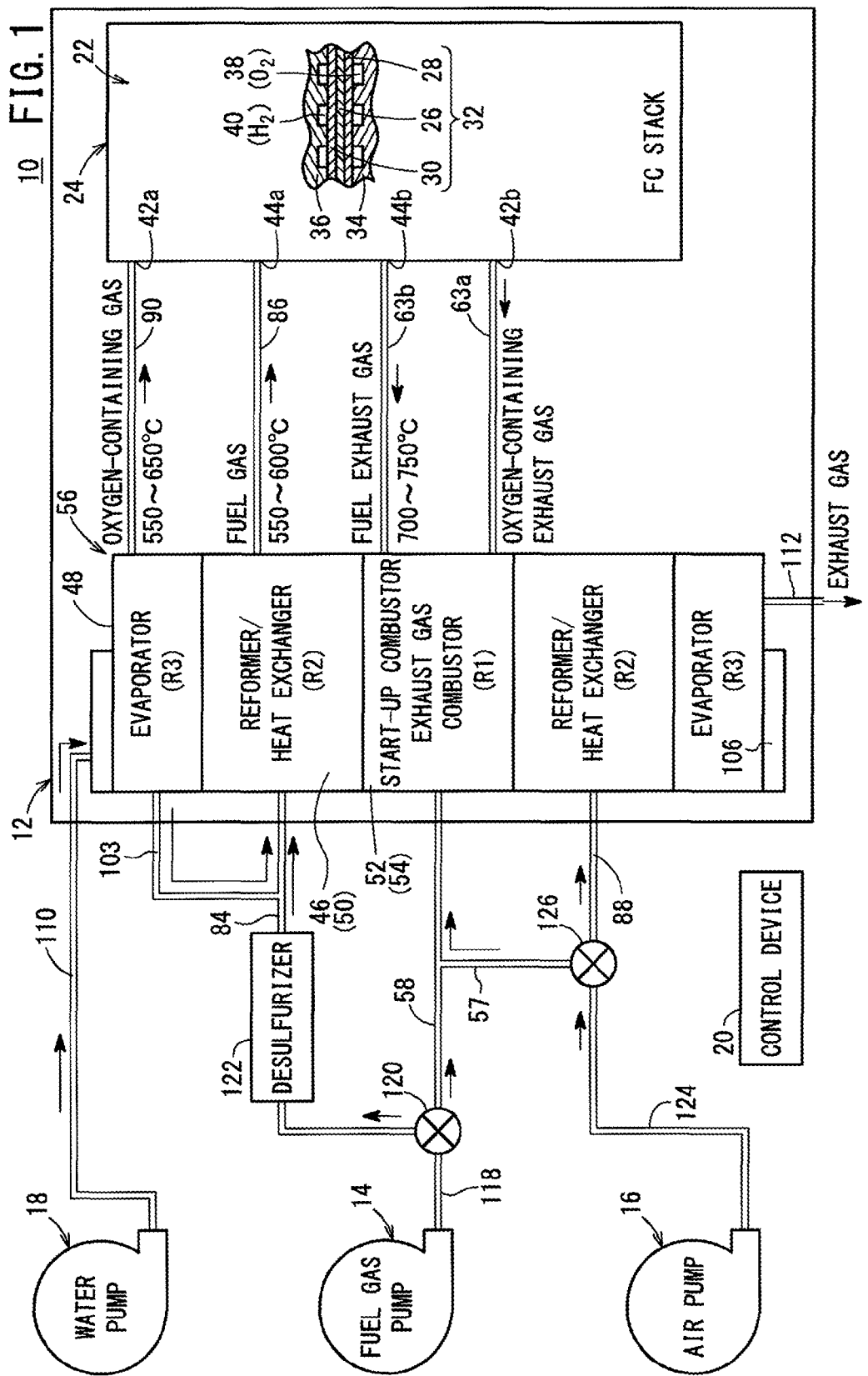
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred °C. Methane in the fuel gas is reformed at the anode 30 to obtain hydrogen and CO, and the hydrogen and CO are supplied to a portion of the electrolyte 26 that faces the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel (e.g., city gas) chiefly containing hydrocarbon, and water vapor to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Basically, the fuel cell module 12 is made up of the fuel cell stack 24 and FC (fuel cell) peripheral equipment (BOP)

Figure 2:
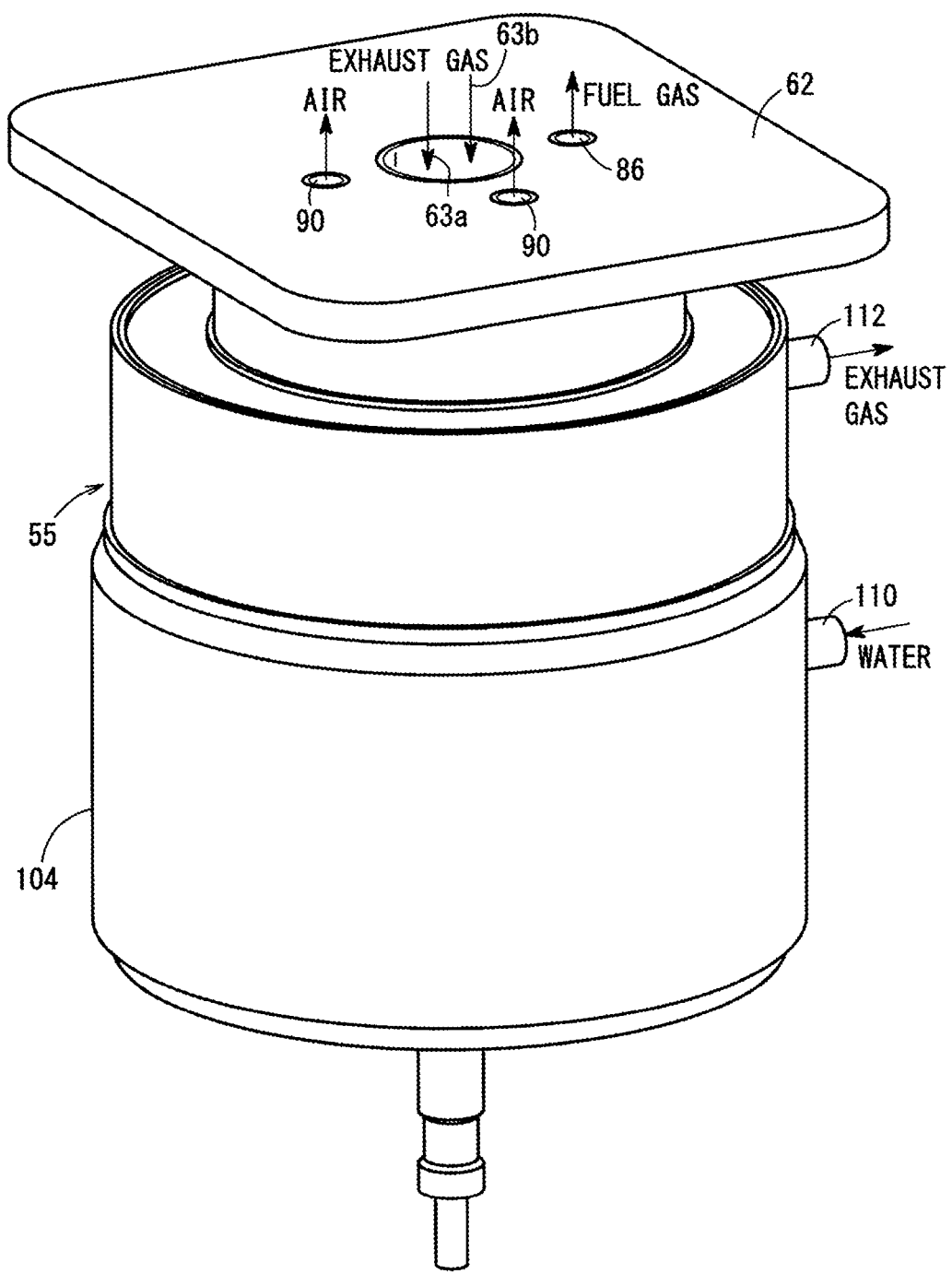
FIG. 2 is a perspective view showing FC peripheral equipment of the fuel cell module.

56 (see FIGS. 1 and 2). The FC peripheral equipment 56 includes the reformer 46, the evaporator 48, the heat exchanger 50, the exhaust gas combustor 52, and the start-up combustor 54.

Figure 3:
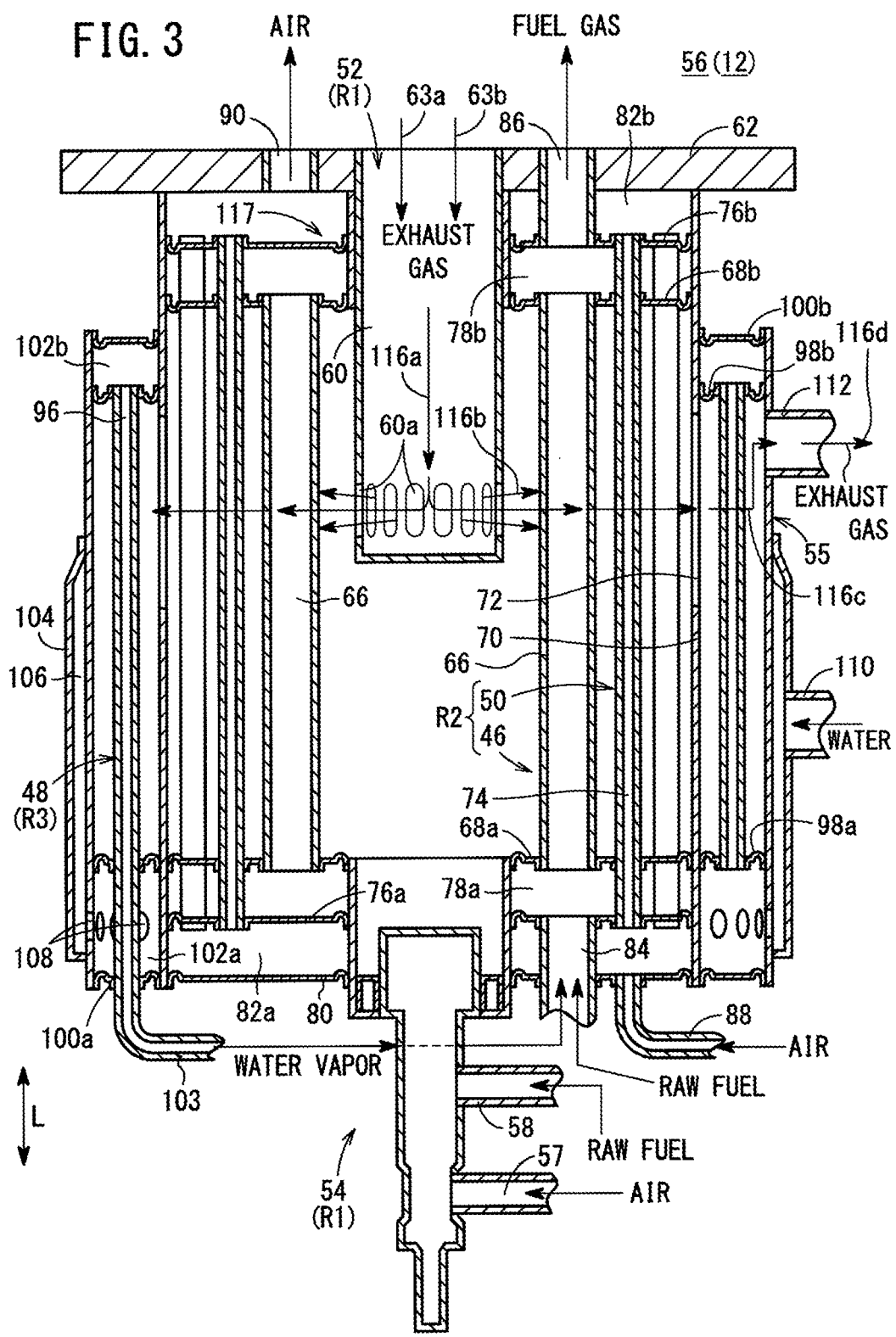
FIG. 3 is a cross sectional view showing the FC peripheral equipment.
Figure 4:
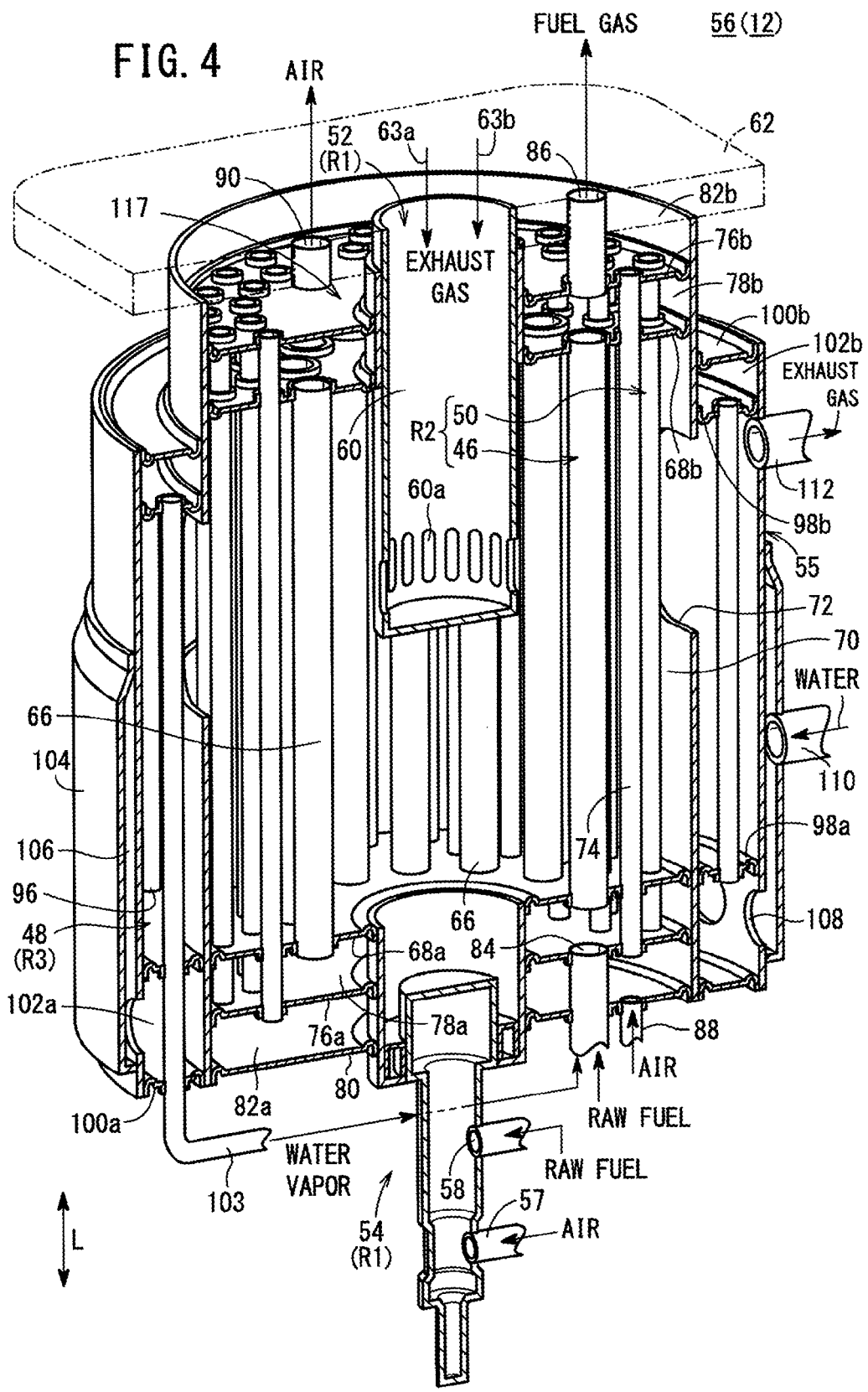
FIG. 4 is a perspective view with partial omission showing the FC peripheral equipment.
Figure 5:
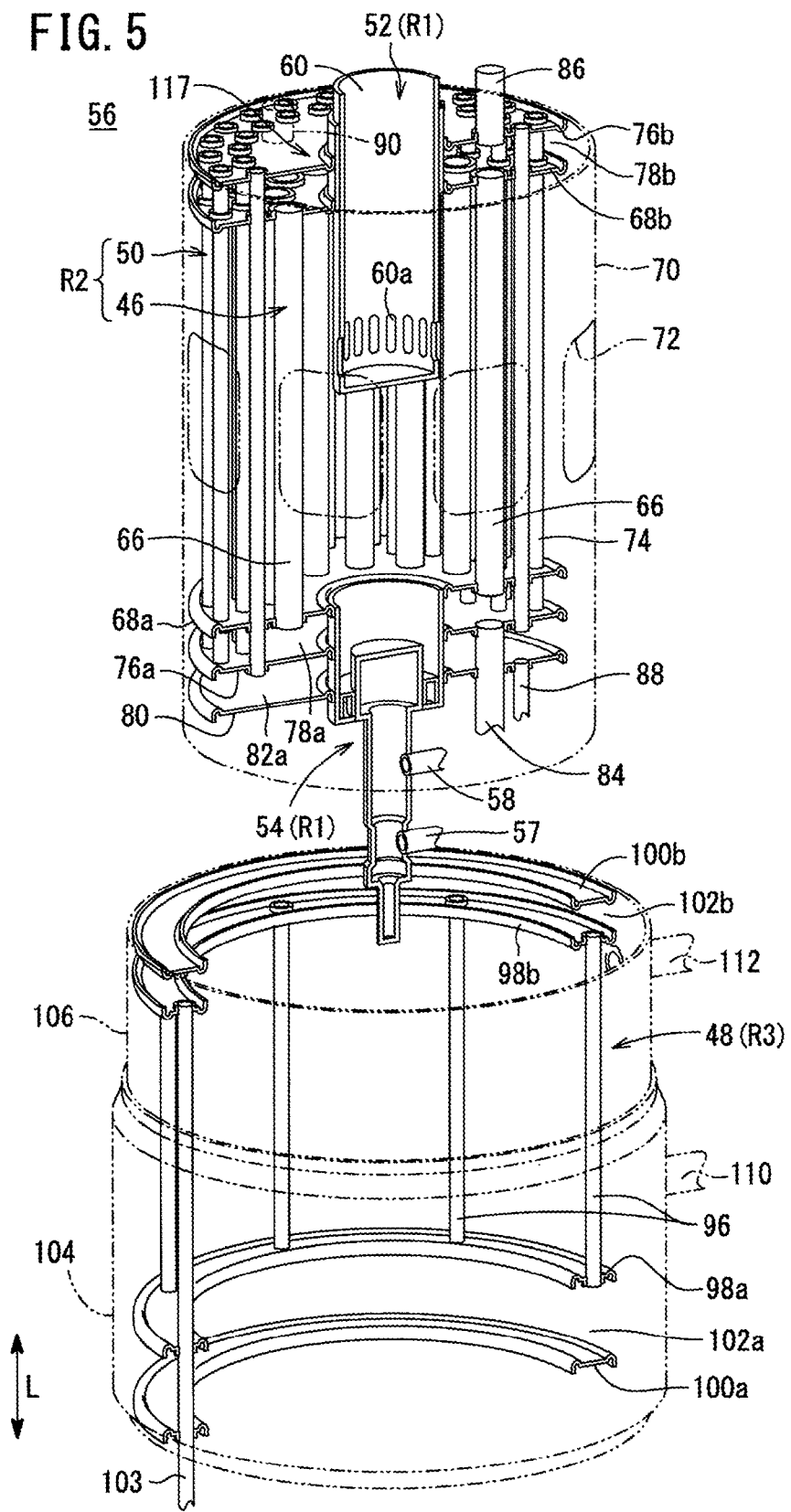
FIG. 5 is an exploded perspective view showing main components of the FC peripheral equipment.

As shown in FIGS. 3 to 5, the FC peripheral equipment 56 includes a first area R1 where the exhaust gas combustor 52 and the start-up combustor 54 are provided, an annular second area R2 formed around the first area R1 and where the reformer 46 and the heat exchanger 50 are provided, an annular third area R3 formed around the second area R2 and where the evaporator 48 is provided. A cylindrical outer member 55 of an outer wall is circumferentially provided outside the third area R3.

The start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57, thereby for sucking the raw fuel.

The exhaust gas combustor 52 is spaced away from the start-up combustor 54, and includes a combustion cup 60 formed in a shape of a cylinder having a bottom. A plurality of holes (e.g., circular holes or rectangular holes) 60a are formed along the outer circumference of an end portion of the combustion cup 60 on the bottom side. A stack attachment plate 62 is engaged with the other end portion of the combustion cup 60 on the bottomless side. The fuel cell stack 24 is attached to the stack attachment plate 62.

One end of an oxygen-containing exhaust gas channel 63a and one end of a fuel exhaust gas channel 63b are provided at the combustion cup 60. The combustion gas is produced inside the combustion cup 60 by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 3 to 5, the reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is set at several hundred ° C.

The reformer 46 includes a plurality of reforming pipes (heat transmission pipes) 66 provided around the exhaust gas combustor 52 and the start-up combustor 54. Each of the reforming pipes 66 are filled with reforming catalyst pellets (not shown). Each reforming pipe 66 is fixed to a first lower ring member 68a at one end (lower end), and fixed to a first upper ring member 68b at the other end (upper end).

The outer circumferential portions of the first lower ring member 68a and the first upper ring member 68b are fixed to the inner circumferential portion of a cylindrical member 70 by welding or the like. The inner circumferential portions of the first lower ring member 68a and the first upper ring member 68b are fixed to the outer circumferential portion of the exhaust gas combustor 52 and the start-up combustor 54 by welding or the like. The cylindrical member 70 extends in an axial direction indicated by an arrow L, and an end of the cylindrical member 70 adjacent to the fuel cell stack 24 is fixed to the stack attachment plate 62. A plurality of openings 72 are formed in the outer circumference of the cylindrical member 70 in a circumferential direction at predetermined height positions.

Figure 6:
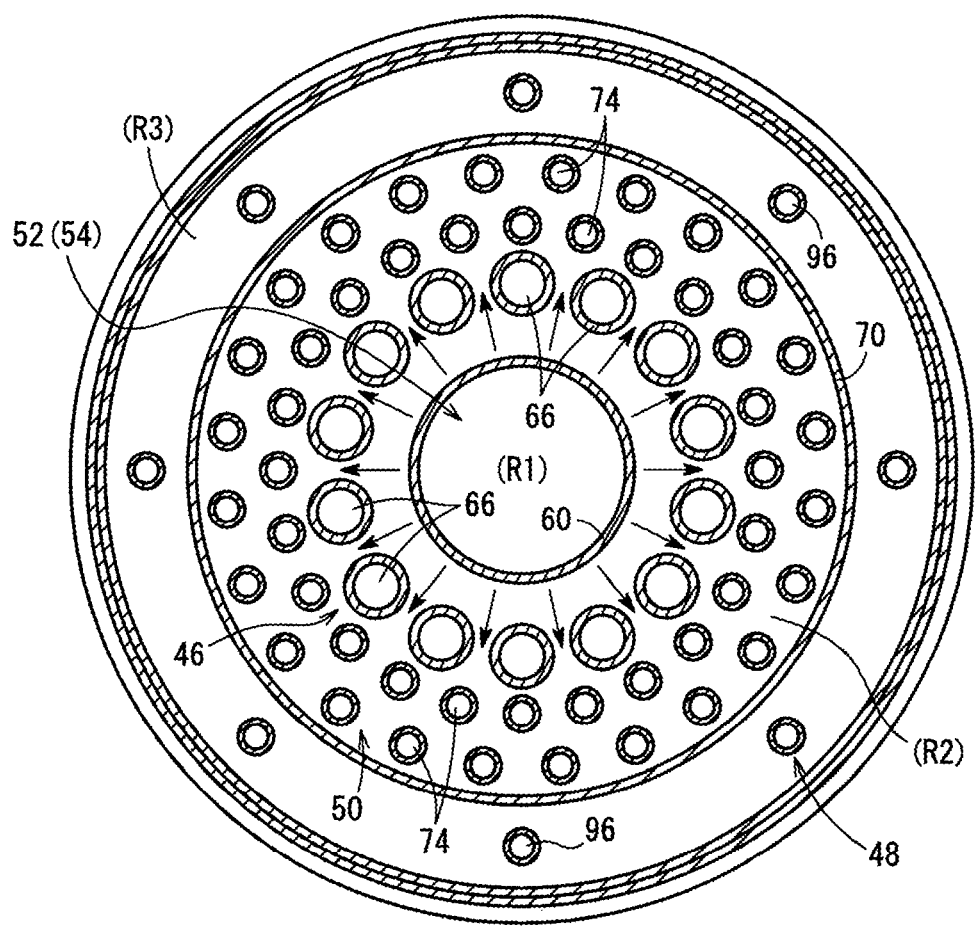
FIG. 6 is a cross sectional plan view showing the FC peripheral equipment.

The heat exchanger 50 has heat exchange pipes (heat transmission pipes) 74 provided adjacent to the reforming pipes 66 of the reformer 46 and arranged radially outwardly with respect to a circular array of the reforming pipes 66 (outside the circular array). As shown in FIG. 6, the reforming pipes 66 are arranged at equal intervals on a virtual circle concentrically around the first area R1. The heat exchange pipes 74 are arranged at equal intervals on two inner and outer virtual circles outside the circular array of the reforming pipes 66, concentrically around the first area R1. The heat exchange pipes 74 arranged along the inner virtual circle and the heat exchange pipes 74 arranged along the outer virtual circle are offset from each other (in a staggered pattern).

As shown in FIGS. 3 and 4, each of the heat exchange pipes 74 is fixed to a second lower ring member 76a at one end (lower end) by welding or the like, and each of the heat exchange pipes 74 is fixed to a second upper ring member 76b at the other end (upper end) by welding or the like. The outer circumferential portions of the second lower ring member 76a and the second upper ring member 76b are fixed to the inner circumferential portion of the cylindrical member 70 by welding or the like. The inner circumferential portions of the second lower ring member 76a and the second upper ring member 76b are fixed to the outer circumferential portions of the exhaust gas combustor 52 and the start-up combustor 54 by welding or the like.

The second lower ring member 76a is positioned below the first lower ring member 68a (outside the first lower ring member 68a in the axial direction), and the second upper ring member 76b is positioned above the first upper ring member 68b (outside the first upper ring member 68b in the axial direction).

An annular mixed gas supply chamber 78a is formed between the first lower ring member 68a and the second lower ring member 76a, and a mixed gas of raw fuel and water vapor is supplied to the mixed gas supply chamber 78a. Further, an annular fuel gas discharge chamber 78b is formed between the first upper ring member 68b and the second upper ring member 76b, and the produced fuel gas (reformed gas) is discharged to the fuel gas discharge chamber 78b. Both ends of each of the reforming pipes 66 are opened to the mixed gas supply chamber 78a and the fuel gas discharge chamber 78b.

A ring shaped end ring member 80 is fixed to an end of the cylindrical member 70 adjacent to the start-up combustor 54 by welding or the like. An annular oxygen-containing gas supply chamber 82a is formed between the end ring member 80 and the second lower ring member 76a, and the oxygen-containing gas is supplied to the oxygen-containing gas supply chamber 82a. An annular oxygen-containing gas discharge chamber 82b is formed between the second upper ring member 76b and the stack attachment plate 62, and the heated oxygen-containing gas is discharged to the oxygen-containing gas discharge chamber 82b. Both ends of each of the heat exchange pipes 74 are opened to the oxygen-containing gas supply chamber 82a and the oxygen-containing gas discharge chamber 82b.

The fuel gas discharge chamber 78b and the oxygen-containing gas discharge chamber 82b are provided in double-deck manner, and the fuel gas discharge chamber 78b is provided inside (below) the oxygen-containing gas discharge chamber 82b in the axial direction. The mixed gas supply chamber 78a and the oxygen-containing gas supply chamber 82a are provided in a double-deck manner, and the mixed gas supply chamber 78a is provided inside (above) the oxygen-containing gas supply chamber 82a in the axial direction.

A raw fuel supply channel 84 is opened to the mixed gas supply chamber 78a, and an evaporation return pipe 103 described later is connected to a position in the middle of the raw fuel supply channel 84 (see FIG. 1). The raw fuel supply channel 84 has an ejector function, and generates negative pressure by the flow of the raw fuel, thereby for sucking the water vapor.

The raw fuel supply channel 84 is fixed to the second lower ring member 76a and the end ring member 80 by welding or the like. One end of a fuel gas channel 86 is connected to the fuel gas discharge chamber 78b, and the other end of the fuel gas channel 86 is connected to the fuel gas supply passage 44a of the fuel cell stack 24 (see FIG. 1). The fuel gas channel 86 is fixed to the second upper ring member 76b by welding or the like, and extends through the stack attachment plate 62 (see FIG. 2).

An oxygen-containing gas supply pipe 88 is connected to the oxygen-containing gas supply chamber 82a. The oxygen-containing gas supply pipe 88 is fixed to the end ring member 80 by welding or the like. One end of each of two oxygen-containing gas pipes 90 is provided in the oxygen-containing gas discharge chamber 82b, and the other end of each of the two oxygen-containing gas pipes 90 extends through the stack attachment plate 62, and is connected to the oxygen-containing gas supply passage 42a of the fuel cell stack 24 (see FIG. 1).

As shown in FIGS. 3 and 4, the evaporator 48 has a plurality of evaporation pipes (heat transmission pipes) 96 provided along, and around the outer circumference of the cylindrical member 70. Each of the evaporation pipes 96 is fixed to a lower ring member 98a at one end (lower end), and fixed to an upper ring member 98b at the other end (upper end).

A lower end ring member 100a is provided below the lower ring member 98a, and an upper end ring member 100b is provided above the upper ring member 98b. The lower end ring member 100a and the upper end ring member 100b are fixed to the outer circumference of the cylindrical member 70 and the inner circumference of the outer member 55 by welding or the like.

An annular water supply chamber 102a is formed between the lower ring member 98a and the lower end ring member 100a, and water is supplied to the water supply chamber 102a. An annular water vapor discharge chamber 102b is formed between the upper ring member 98b and the upper end ring member 100b, and water vapor is discharged to the water vapor discharge chamber 102b. Both ends of each of the evaporation pipes 96 are fixed to the lower ring member 98a and the upper ring member 98b by welding or the like, and opened to the water supply chamber 102a and the water vapor discharge chamber 102b.

The mixed gas supply chamber 78a and the oxygen-containing gas supply chamber 82a are placed inside the inner circumferential portion of the water supply chamber 102a. The water vapor discharge chamber 102b is provided outside the fuel gas discharge chamber 78b at a position offset downward from the fuel gas discharge chamber 78b in the axial direction (downward in the pipe length direction). One end of the evaporation return pipe 103 including at least one of the evaporation pipes 96 is provided in the water vapor discharge chamber 102b, and the other end of the evaporation return pipe 103 is connected to a position in the middle of the raw fuel supply channel 84 (see FIG. 1).

A cylindrical cover member 104 is fixed to the outer circumferential portion of the outer member 55. The center of the cylindrical cover member 104 is offset to a lower position. Both of upper and lower ends (both of axial ends) of the cover member 104 are welded to the outer member 55, and a heat recovery area (chamber) 106 is formed between the cover member 104 and the outer circumferential portion of the outer member 55.

A plurality of holes 108 are formed circumferentially in a lower end portion of the outer member 55 of the water supply chamber 102a, and the water supply chamber 102a is connected to the heat recovery area 106 through the holes 108. A water supply pipe 110 communicating with the heat recovery area 106 is connected to the cover member 104. An exhaust gas pipe 112 communicating with the third area R3 is connected to an upper portion of the outer member 55.

As shown in FIG. 3, a first combustion gas channel 116a as a passage of the combustion gas is formed in the first area R1, and a second combustion gas channel 116b as a passage of the combustion gas which has passed through the holes 60a is formed in the second area R2. A third combustion gas channel 116c as a passage of the combustion gas which has passed through the openings 72 is formed in the third area R3. Further, a fourth combustion gas channel 116d as a passage of the combustion gas is formed after the exhaust gas pipe 112. The second combustion gas channel 116b forms the reformer 46 and the heat exchanger 50, and the third combustion gas channel 116c forms the evaporator 48.

In the first embodiment, a stress relaxing portion 117 for relaxing heat stress is provided at least along a border between the first area R1 and the second area R2, along a border between the second area R2 and the third area R3, or along the outermost portion of the third area R3 (in particular, area which is likely to be exposed to high heat).

The stress relaxing portion 117 is provided at least in one of the fuel gas discharge chamber 78b, the oxygen-containing gas discharge chamber 82b, and the water vapor discharge chamber 102b. In the first embodiment, the stress relaxing portions 117 are provided respectively in the first upper ring member 68b, the second upper ring member 76b, the upper ring member 98b, and the upper end ring member 100b of all of these chambers (see FIG. 7).

Further, the stress relaxing portion 117 is provided in at least one of the mixed gas supply chamber 78a, the oxygen-containing gas supply chamber 82a, and the water supply chamber 102a. In the first embodiment, the stress relaxing portions 117 are provided respectively in the first lower ring member 68a, the second lower ring member 76a, the end ring member 80, the lower ring member 98a, and the lower end ring member 100a of all of these chambers.

Specifically, the stress relaxing portion 117 includes an inner curved portion 117in and an outer curved portion 117out each having a semicircular shape in cross section, provided respectively in an inner circumferential portion and an outer circumferential portion of each of the ring members. In particular, the inner curved portion 117in needs to be provided in an inner circumferential portion of the first upper ring member 68b and an inner circumferential portion of the second upper ring member 76b which are adjacent to the exhaust gas combustor 52 which is exposed to the hot combustion gas. Further, it is desirable to provide the inner curved portion 117in in an inner circumferential portion of the first lower ring member 68a and an inner circumferential portion of the second lower ring member 76a which are adjacent to the start-up combustor 54.

The inner curved portion 117in and the outer curved portion 117out function as springs having low rigidity for absorbing displacement to form the stress relaxing portion 117. It should be noted that only one of the inner curved portion 117in and the outer curved portion 117out may be provided.

As shown in FIG. 1, the raw fuel supply apparatus 14 includes a raw fuel channel 118. The raw fuel channel 118 is branched into the raw fuel supply channel 84 and the raw fuel supply pipe 58 through a raw fuel control valve 120. A desulfurizer 122 for removing sulfur compounds in the city gas (raw fuel) is provided in the raw fuel supply channel 84.

The oxygen-containing gas supply apparatus 16 includes an oxygen-containing gas channel 124. The oxygen-containing gas channel 124 is branched into the oxygen-containing gas supply pipe 88 and the air supply pipe 57 through an oxygen-containing gas control valve 126. The water supply apparatus 18 is connected to the evaporator 48 through the water supply pipe 110.

Operation of the fuel cell system 10 will be described below.

At the time of starting operation of the fuel cell system 10, the air (oxygen-containing gas) and the raw fuel are supplied to the start-up combustor 54. Specifically, in the oxygen-containing gas supply apparatus 16, by operation of the air pump, the air is supplied to the oxygen-containing gas channel 124. By adjusting the opening degree of the oxygen-containing gas control valve 126, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 118. By adjusting the opening degree of the raw fuel control valve 120, the raw fuel is supplied into the raw fuel supply pipe 58. The raw fuel is mixed with the air, and supplied into the start-up combustor 54 (see FIGS. 3 and 4).

Thus, the mixed gas of the raw fuel and the air is supplied into the start-up combustor 54, and the mixed gas is ignited to start combustion. Therefore, the combustion gas produced in combustion flows from the first area R1 to the second area R2. Further, the combustion gas is supplied to the third area R3, and then, the combustion gas is discharged to the outside of the fuel cell module 12 through the exhaust gas pipe 112.

As shown in FIGS. 3 and 4, the reformer 46 and the heat exchanger 50 are provided in the second area R2, and the evaporator 48 is provided in the third area R3. Thus, the combustion gas discharged from the first area R1 first heats the reformer 46, next heats the heat exchanger 50, and then heats the evaporator 48.

Then, after the temperature of the fuel cell module 12 is raised to a predetermined temperature, the air (oxygen-containing gas) is supplied to the heat exchanger 50, and the mixed gas of the raw fuel and the water vapor is supplied to the reformer 46.

Specifically, as shown in FIG. 1, the opening degree of the oxygen-containing gas control valve 126 is adjusted such that the flow rate of the air supplied to the oxygen-containing gas supply pipe 88 is increased, and the opening degree of the raw fuel control valve 120 is adjusted such that the flow rate of the raw fuel supplied to the raw fuel supply channel 84 is increased. Further, by operation of the water supply apparatus 18, the water is supplied to the water supply pipe 110. The air flows from the oxygen-containing gas supply pipe 88 into the oxygen-containing gas supply chamber 82a.

Therefore, as shown in FIGS. 3 and 4, the air flows into the heat exchanger 50, and after the air is temporarily supplied to the oxygen-containing gas supply chamber 82a, while the air is moving inside the heat exchange pipes 74, the air is heated by heat exchange with the combustion gas supplied into the second area R2. After the heated air is temporarily supplied to the oxygen-containing gas discharge chamber 82b, the air is supplied to the oxygen-containing gas supply passage 42a of the fuel cell stack 24 through the oxygen-containing gas pipe 90 (see FIG. 1). In the fuel cell stack 24, the heated air flows along the oxygen-containing gas flow field 38, and the air is supplied to the cathode 28.

After the air flows through the oxygen-containing gas flow field 38, the air is discharged from the oxygen-containing gas discharge passage 42b into the oxygen-containing exhaust gas channel 63a. The oxygen-containing exhaust gas channel 63a is opened to the combustion cup 60 of the exhaust gas combustor 52, and the oxygen-containing exhaust gas is supplied into the combustion cup 60.

Further, as shown in FIG. 1, the water from the water supply apparatus 18 is supplied to the evaporator 48. After the raw fuel is desulfurized at the desulfurizer 122, the raw fuel flows through the raw fuel supply channel 84, and moves toward the reformer 46.

In the evaporator 48, the water is supplied from the water supply pipe 110 to the heat recovery area 106 of the outer member 55. Therefore, after the water is temporarily supplied to the water supply chamber 102a through the holes 108, while water is moving inside the evaporation pipes 96, the water is heated by the combustion gas flowing through the third area R3, and then vaporized.

After the water vapor flows into the water vapor discharge chamber 102b temporarily, the water vapor is supplied to the evaporation return pipe 103 connected to the water vapor discharge chamber 102b. Thus, the water vapor flows inside the evaporation return pipe 103, and flows into the raw fuel supply channel 84. Then, the water vapor is mixed with the raw fuel supplied by the raw fuel supply apparatus 14 to produce the mixed gas.

The mixed gas from the raw fuel supply channel 84 is temporarily supplied to the mixed gas supply chamber 78a of the reformer 46. The mixed gas moves inside the reforming pipes 66. In the meanwhile, the mixed gas is heated by the combustion gas flowing through the second area R2, and steam reforming is performed. After removal (reforming) of hydrocarbon of $C_{2+}$, a reformed gas chiefly containing methane is obtained.

This reformed gas is temporarily supplied as the heated fuel gas to the fuel gas discharge chamber 78b. Thereafter, the fuel gas is supplied to the fuel gas supply passage 44a of the fuel cell stack 24 through the fuel gas channel 86 (see FIG. 1). In the fuel cell stack 24, the heated fuel gas flows along the fuel gas flow field 40, and the fuel gas is supplied to the anode 30, while the air is supplied to the cathode 28, thereby for generating electricity in the electrolyte electrode assembly 32.

After the fuel gas flows through the fuel gas flow field 40, the fuel gas is discharged from the fuel gas discharge passage 44b to the fuel exhaust gas channel 63b. The fuel exhaust gas channel 63b is opened to the inside of the combustion cup 60 of the exhaust gas combustor 52, and the fuel exhaust gas is supplied into the combustion cup 60.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the combustion cup 60. In the meanwhile, combustion operation by the start-up combustor 54 is stopped.

The combustion cup 60 has the holes 60a. Therefore, as shown in FIG. 3, the combustion gas supplied into the combustion cup 60 flows through the holes 60a from the first area R1 into the second area R2. Then, after the combustion gas is supplied to the third area R3, the combustion gas is discharged to the outside of the fuel cell module 12.

In the first embodiment, the FC peripheral equipment 56 includes the first area R1 where the exhaust gas combustor 52 and the start-up combustor 54 are provided, the annular second area R2 around the first area R1 and where the reformer 46 and the heat exchanger 50 are provided, and the annular third area R3 around the second area R2 and where the evaporator 48 is provided.

That is, the first area R1 is provided at the center, the annular second area R2 is provided around the first area R1, and the annular third area R3 is provided around the second area R2. In the structure, generation of waste heat and heat radiation can be suppressed suitably. Thus, improvement in the heat efficiency is achieved, thermally self-sustaining operation is facilitated, and simple and compact structure of the fuel cell module 12 is achieved as a whole. Thermally self-sustaining operation herein means operation where the operating temperature of the fuel cell 22 is maintained using only heat energy generated in the fuel cell 22, without supplying additional heat from the outside.

Further, the stress relaxing portion 117 for relaxing heat stress is provided (especially in areas which tend to be exposed to high heat) at least along the border between the first area R1 and the second area R2 (at least one of the inner circumferential portion of the first upper ring member 68b, the inner circumferential portion of the second upper ring member 76b, the inner circumferential portion of the first lower ring member 68a, the inner circumferential portion of the second lower ring member 76a, and the inner circumferential portion of the end ring member 80), along the border between the second area R2 and the third area R3 (at least one of the outer circumferential portion of the first upper ring member 68b, the outer circumferential portion of the second upper ring member 76b, the outer circumferential portion of the first lower ring member 68a, the outer circumferential portion of the second lower ring member 76a, or the outer circumferential portion of the end ring member 80, and at least one of the inner circumferential portion of the upper ring member 98b, the inner circumferential portion of the upper end ring member 100b, the inner circumferential portion of the lower ring member 98a, and the inner circumferential portion of the lower end ring member 100a), or along the outermost portion of the third area R3 (at least one of the outer circumferential portion of the upper ring member 98b, the outer circumferential portion of the upper end ring member 100b, the outer circumferential portion of the lower ring member 98a, and the outer circumferential portion of the lower end ring member 100a).

Therefore, when the FC peripheral equipment 56 including the exhaust gas combustor 52, the start-up combustor 54, the reformer 46, the heat exchanger 50, and the evaporator 48 are expanded by heat, the heat stress applied to these components in the radial direction and the axial direction is relaxed by the stress relaxing portion 117. Accordingly, it becomes possible to suitably suppress degradation in the durability of the FC peripheral equipment 56 due to heat stress.

In particular, the stress relaxing portion 117 is provided in at least one of the fuel gas discharge chamber 78b, the oxygen-containing gas discharge chamber 82b, and the water vapor discharge chamber 102b. In the first embodiment, the stress relaxing portions 117 are provided respectively in the first upper ring member 68b, the second upper ring member 76b, the upper ring member 98b, and the upper end ring member 100b of all of these chambers.

Further, the stress relaxing portion 117 is provided in at least one of the mixed gas supply chamber 78a, the oxygen-containing gas supply chamber 82a, and the water supply chamber 102a. In the first embodiment, the stress relaxing portions 117 are provided respectively in the first lower ring member 68a, the second lower ring member 76a, the end ring member 80, the lower ring member 98a, and the lower end ring member 100a of all of these chambers.

Figure 7:
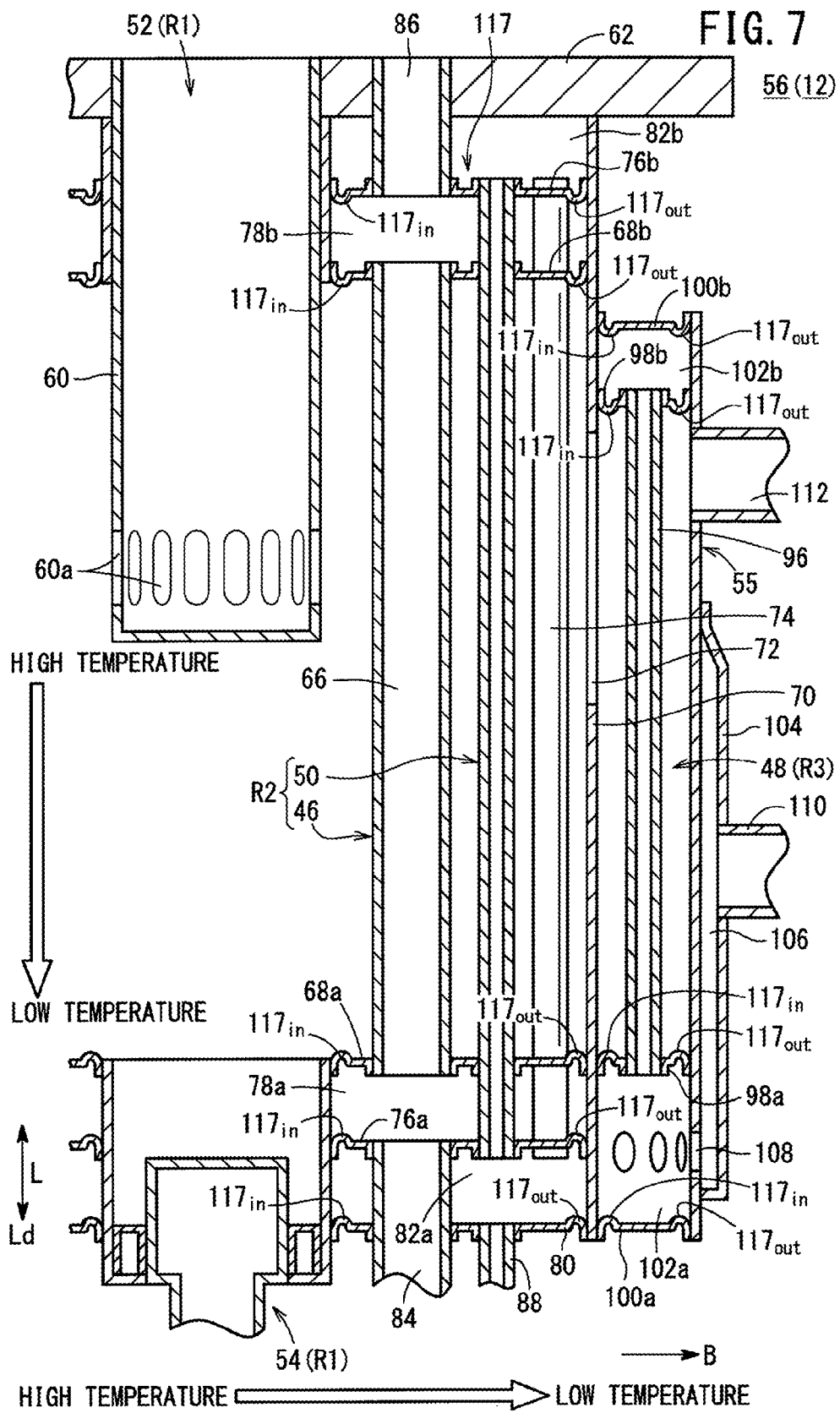
FIG. 7 is a view showing a stress relaxing portion.

As shown in FIG. 7, in the FC peripheral equipment 56, the temperature tend to be decreased from the high temperature in the first area R1 to the low temperature in the third area R3 in the direction indicated by the arrow B, and temperature tends to be decreased from the high temperature to the low temperature in the direction away from the fuel cell stack 24 indicated by the arrow Ld. Therefore, in the FC peripheral equipment 56, temperature differences occur easily in the radial direction and in the axial direction.

In order to address the temperature differences, the stress relaxing portion 117 is provided at least at portions exposed to the hot exhaust gas. In this manner, when the FC peripheral equipment 56 is expanded by heat, the stress relaxing portion 117 can relax the heat stress in the radial direction and the heat stress in the axial direction. Accordingly, it becomes possible to suppress degradation in the durability of the FC peripheral equipment 56 due to the heat stress.

In particular, the inner curved portions 117in and the outer curved portions 117out each having a semicircular shape in cross section are provided respectively in the inner circumferential portions and the outer circumferential portions of the first upper ring member 68b and the second upper ring member 76b which are exposed to the high heat atmosphere. Thus, with the simple and economical structure, the stress relaxing portion 117 can reliably relax the stress in the radial direction and the stress in the axial direction caused by expansion of the FC peripheral equipment 56. Moreover, it becomes possible to achieve improvement in the durability of the FC peripheral equipment 56.

Further, in the first embodiment, as shown in FIG. 3, the reformer 46 includes the annular mixed gas supply chamber 78a, the annular fuel gas discharge chamber 78b, the reforming pipes 66, and the second combustion gas channel 116b. The mixed gas is supplied to the mixed gas supply chamber 78a, the produced fuel gas is discharged into the fuel gas discharge chamber 78b. The reforming pipes 66 each include one end connected to the mixed gas supply chamber 78a, and the other end connected to the fuel gas discharge chamber 78b. The second combustion gas channel 116b supplies the combustion gas into the spaces between the reforming pipes 66.

The heat exchanger 50 includes the annular oxygen-containing gas supply chamber 82a, the annular oxygen-containing gas discharge chamber 82b, the heat exchange pipes 74, and the second combustion gas channel 116b. The oxygen-containing gas is supplied to the oxygen-containing gas supply chamber 82a, and the heated oxygen-containing gas is discharged into the oxygen-containing gas discharge chamber 82b. The heat exchange pipes 74 each include one end connected to the oxygen-containing gas supply chamber 82a, and the other end connected to the oxygen-containing gas discharge chamber 82b. The combustion gas is supplied to the spaces between the heat exchange pipes 74 through the second combustion gas channel 116b.

The evaporator 48 includes the annular water supply chamber 102a, the annular water vapor discharge chamber 102b, the evaporation pipes 96, and the third combustion gas channel 116*c*. The water is supplied to the water supply chamber 102*a*, and the water vapor is discharged into the water vapor discharge chamber 102*b*. The evaporation pipes 96 each include one end connected to the water supply chamber 102*a*, and the other end connected to the water vapor discharge chamber 102*b*. The third combustion gas channel 116*c* supplies the combustion gas into the spaces between the evaporation pipes 96.

As described above, the annular supply chambers (mixed gas supply chamber 78*a*, oxygen-containing gas supply chamber 82*a*, and water supply chamber 102*a*), the annular discharge chambers (fuel gas discharge chamber 78*b*, oxygen-containing gas discharge chamber 82*b*, and water vapor discharge chamber 102*b*) and the pipes (reforming pipes 66, heat exchange pipes 74, and evaporation pipes 96) are provided as basic structure. Thus, simple structure is achieved easily. Accordingly, the production cost of the fuel cell module 12 is reduced effectively. Further, by changing the volumes of the supply chambers and the discharge chambers, the length, the diameter, and the number of the pipes, the desired operation can be achieved depending on various operating conditions, and a wider variety of designs become available.

Further, the fuel gas discharge chamber 78*b* and the oxygen-containing gas discharge chamber 82*b* are provided in a double-deck manner, and the fuel gas discharge chamber 78*b* is provided on the inner side of the oxygen-containing gas discharge chamber 82*b* in the axial direction (i.e., below the oxygen-containing gas discharge chamber 82*b*). The mixed gas supply chamber 78*a* and the oxygen-containing gas supply chamber 82*a* are provided in a double-deck manner, and the mixed gas supply chamber 78*a* is provided on the inner side the oxygen-containing gas supply chamber 82*a* in the axial direction (i.e., above the oxygen-containing gas supply chamber 82*a*).

In the structure, in the second area R2, it becomes possible to provide the reformer 46 and the heat exchanger 50 in a small space efficiently, and reduction in the overall size of the FC peripheral equipment 56 is achieved easily.

Further, the mixed gas supply chamber 78*a* is formed between the first lower ring member (inner ring) 68*a* into which ends of the reforming pipes 66 are inserted and the second lower ring member (outer ring) 76*a* spaced away from the first lower ring member 68*a*. The fuel gas discharge chamber 78*b* is formed between the first upper ring member (inner ring) 68*b* into which ends of the reforming pipes 66 are inserted and the second upper ring member (outer ring) 76*b* spaced away from the first upper ring member 68*b*.

Further, the oxygen-containing gas supply chamber 82*a* is formed between the second lower ring member (inner ring) 76*a* into which ends of the heat exchange pipes 74 are inserted and the end ring member (outer ring) 80 spaced away from the second lower ring member 76*a*. The oxygen-containing gas discharge chamber 82*b* is formed between the second upper ring member (inner ring) 76*b* into which ends of the heat exchange pipes 74 are inserted and the stack attachment plate (outer ring) 62 spaced away from the second upper ring member 76*b*.

Likewise, the water supply chamber 102*a* is formed between the lower ring member (inner ring) 98*a* into which ends of the evaporation pipes 96 are inserted and the lower end ring member (outer ring) 100*a* spaced away from the lower ring member 98*a*. The water vapor discharge chamber 102*b* is formed between the upper ring member (inner ring) 98*b* into which ends of the evaporation pipes 96 are inserted and the upper end ring member (outer ring) 100*b* spaced away from the upper ring member 98*b*.

In the structure, each of the mixed gas supply chamber 78*a*, the fuel gas discharge chamber 78*b*, the oxygen-containing gas supply chamber 82*a*, the oxygen-containing gas discharge chamber 82*b*, the water supply chamber 102*a*, and the water vapor discharge chamber 102*b* is made of the inner ring and the outer ring, and the structure of these chambers is simplified effectively. Thus, the production cost is reduced effectively, and the size reduction is achieved easily.

Further, the fuel gas discharge chamber 78*b*, the oxygen-containing gas discharge chamber 82*b*, and the water vapor discharge chamber 102*b* are provided at one end adjacent to the fuel cell stack 24, and the mixed gas supply chamber 78*a*, the oxygen-containing gas supply chamber 82*a*, and the water supply chamber 102*a* are provided at the opposite end remote from the fuel cell stack 24.

In the structure, the heated reactant gases immediately after reforming (fuel gas and oxygen-containing gas) can be supplied to the fuel cell stack 24 promptly. Further, the exhaust gas from the fuel cell stack 24 can be supplied to the exhaust gas combustor 52, the reformer 46, the heat exchanger 50, and the evaporator 48 of the FC peripheral equipment 56 while suppressing decrease in the temperature of the exhaust gas from the fuel cell stack 24 due to heat radiation as much as possible. Thus, improvement in the heat efficiency is achieved, and thermally self-sustaining operation is facilitated.

Further, the fuel cell module 12 is a solid oxide fuel cell module. Therefore, the fuel cell module 12 is optimally applicable to high temperature type fuel cells such as SOFC.

Figure 8:
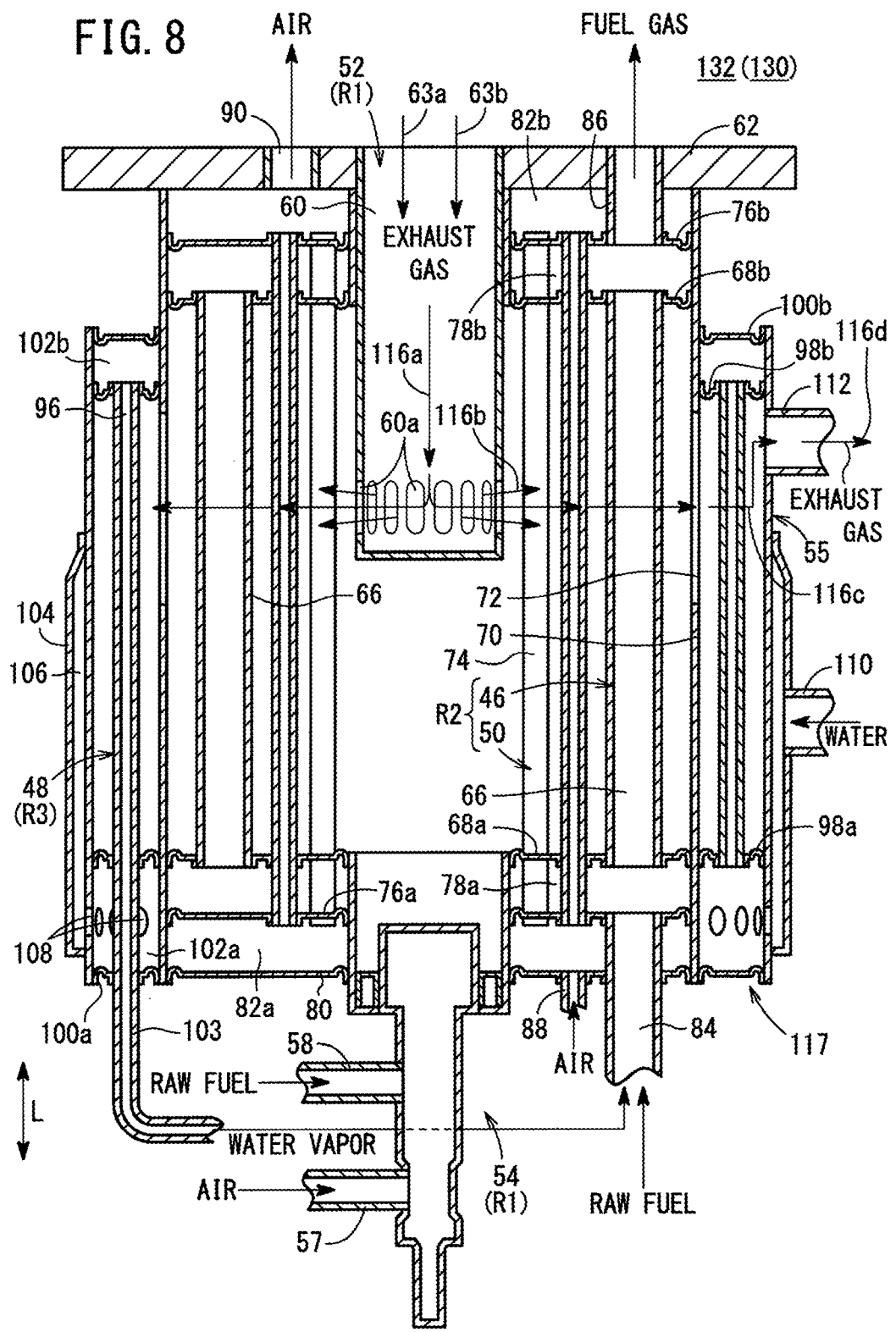
FIG. 8 is a cross sectional view showing FC peripheral equipment of a fuel cell module according to a second embodiment of the present invention.

FIG. 8 is a cross sectional view showing FC peripheral equipment 132 of a fuel cell module 130 according to a second embodiment of the present invention.

The constituent elements of the fuel cell module 130 that are identical to those of the fuel cell module 12 according to the first embodiment are labeled with the same reference numeral, and description thereof will be omitted.

Figure 9:
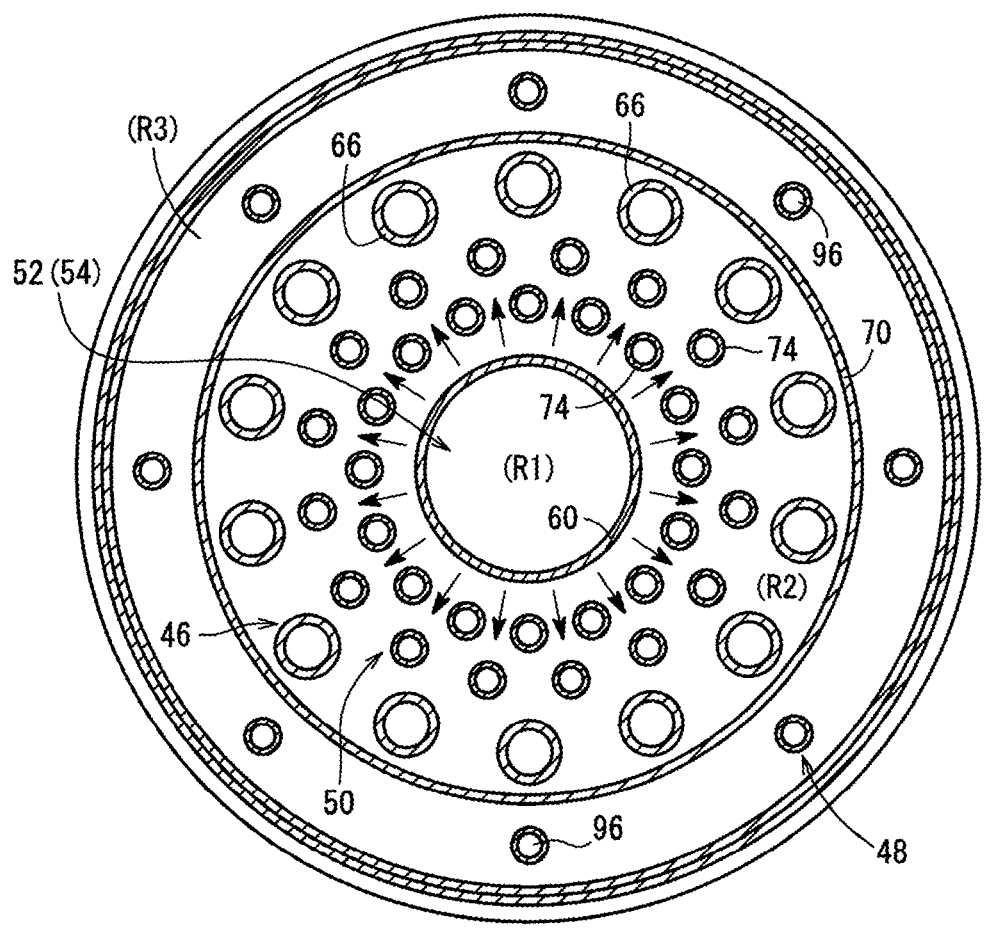
FIG. 9 is a cross sectional plan view showing the FC peripheral equipment.

As shown in FIGS. 8 and 9, in the FC peripheral equipment 132, the reformer 46 is provided outside the heat exchanger 50 in the radial direction in the second area R2. The heat exchanger 50 includes heat exchange pipes 74 arranged along two virtual circles around the first area R1 in a zigzag pattern (in a staggered manner). The reformer 46 includes reforming pipes 66 arranged along a virtual circle around the first area R1, outside the heat exchange pipes 74.

In the second embodiment, the same advantages as in the case of the first embodiment are obtained.

In the first and second embodiments, the stress relaxing portion 117 including the inner curved portion 117*in* and the outer curved portion 117*out* each having a semicircular shape in cross section is used. However, the present invention is not limited in this respect.

Figure 10:
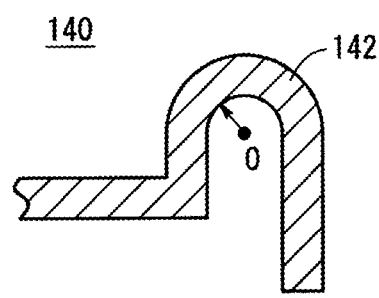
FIG. 10 is a view showing the stress relaxing portion having another shape.

For example, a stress relaxing portion 140 shown in FIG. 10 includes a curved portion 142 having an eccentric semicircular shape with a positionally offset center O in cross section. The curved portion 142 is applicable to the inner curved portion and the outer curved portion.

Figure 11:
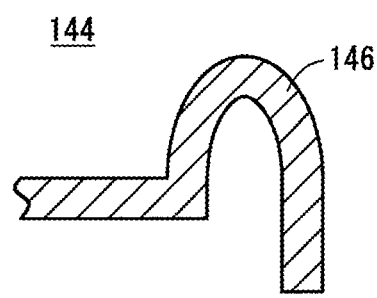
FIG. 11 is a view showing the stress relaxing portion having still another shape.

A stress relaxing portion 144 shown in FIG. 11 includes a curved portion 146 having part of an ellipse shape in cross section. The curved portion 146 is applicable to the inner curved portion and the outer curved portion.

Figure 12:
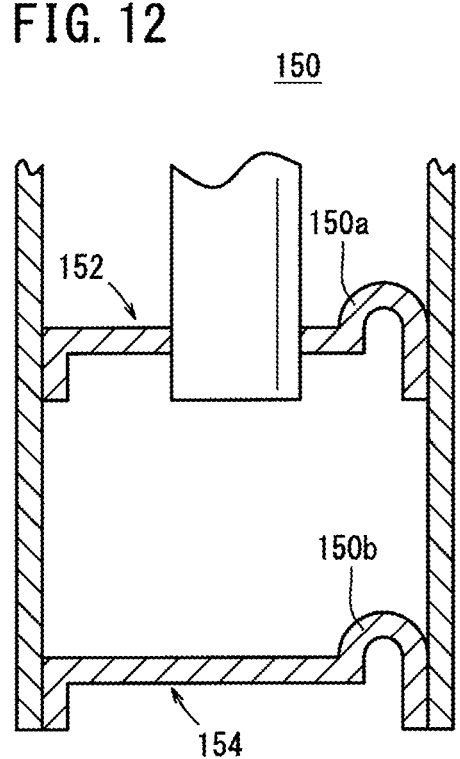
FIG. 12 is a view showing the stress relaxing portion having yet another shape.

A stress relaxing portion 150 shown in FIG. 12 is provided in an inner ring 152 and an outer ring 154. A curved portion 150*a* of the stress relaxing portion 150 is formed only in an outer circumferential portion (or inner circumferential portion) of the inner ring 152, and a curved portion 150b of the stress relaxing portion 150 is only formed in an outer circumferential portion (or inner circumferential portion) of the outer ring 154.

Figure 13:
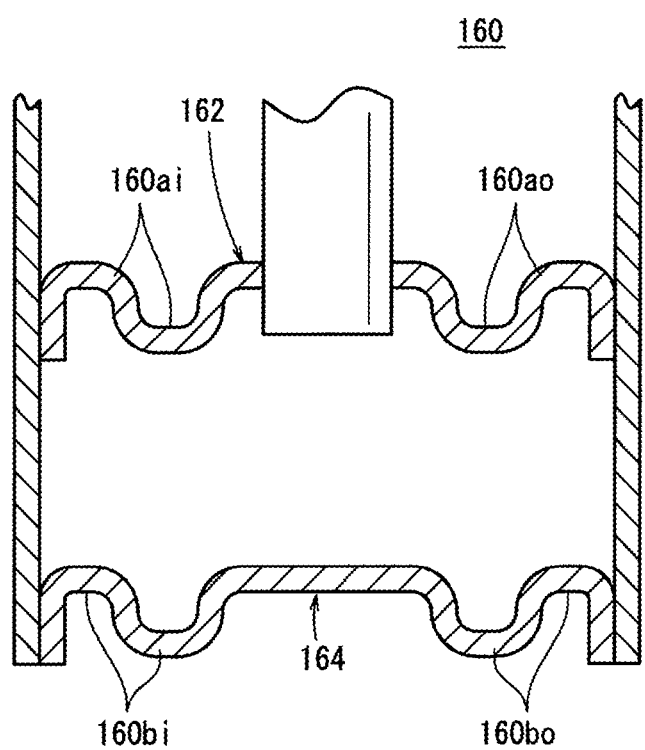
FIG. 13 is a view showing the stress relaxing portion having yet still another shape.
Figure 14:
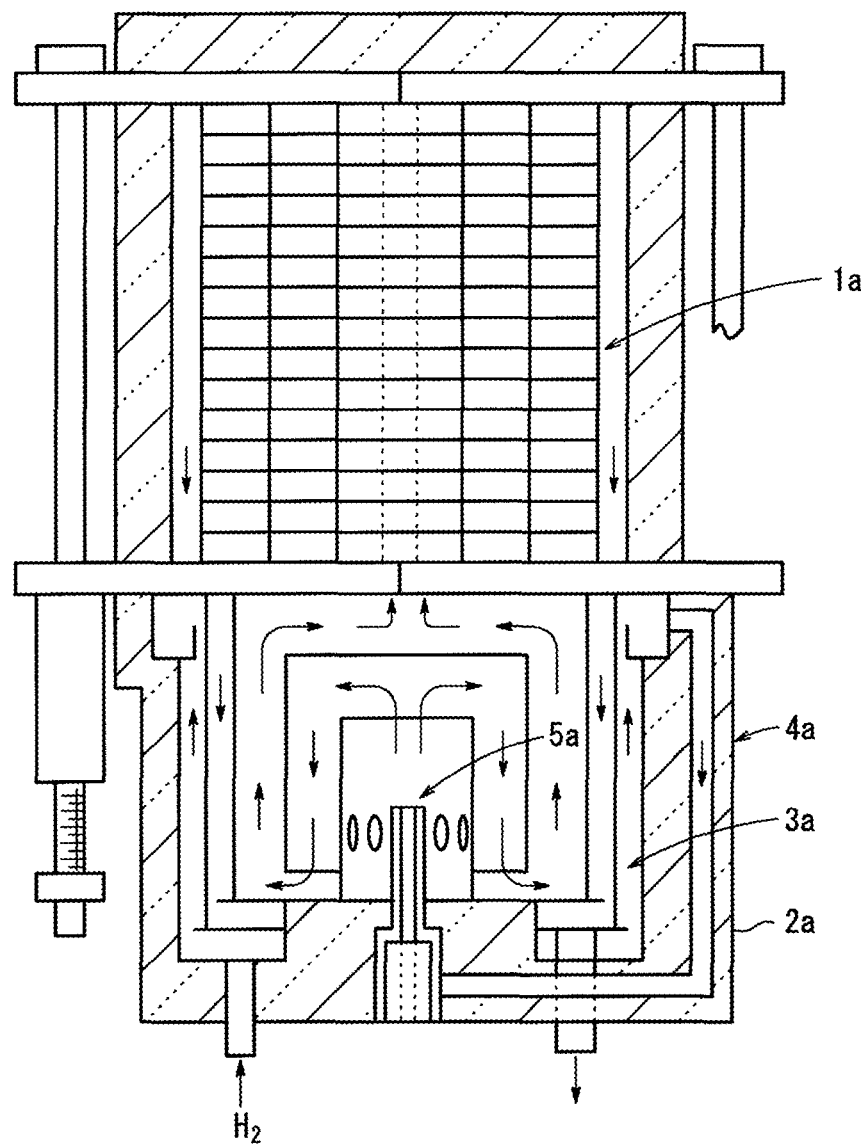
FIG. 14 is a view schematically showing a fuel cell battery disclosed in the conventional technique 1.
Figure 15:
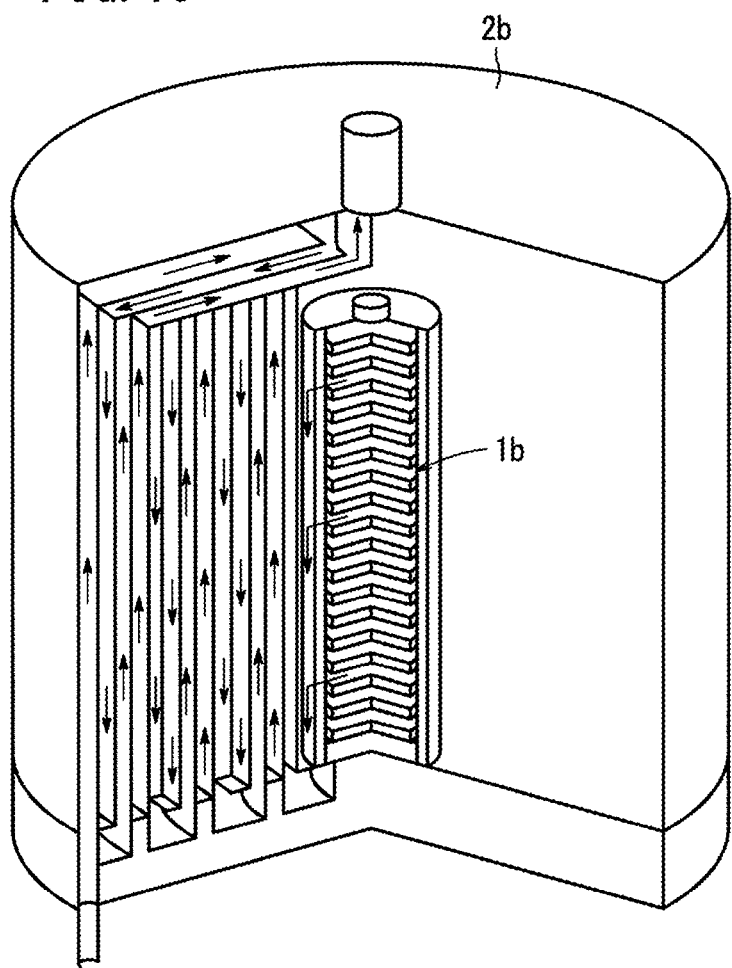
FIG. 15 is a perspective view with partial cutout, showing a solid oxide fuel cell disclosed in the conventional technique 2.
Figure 16:
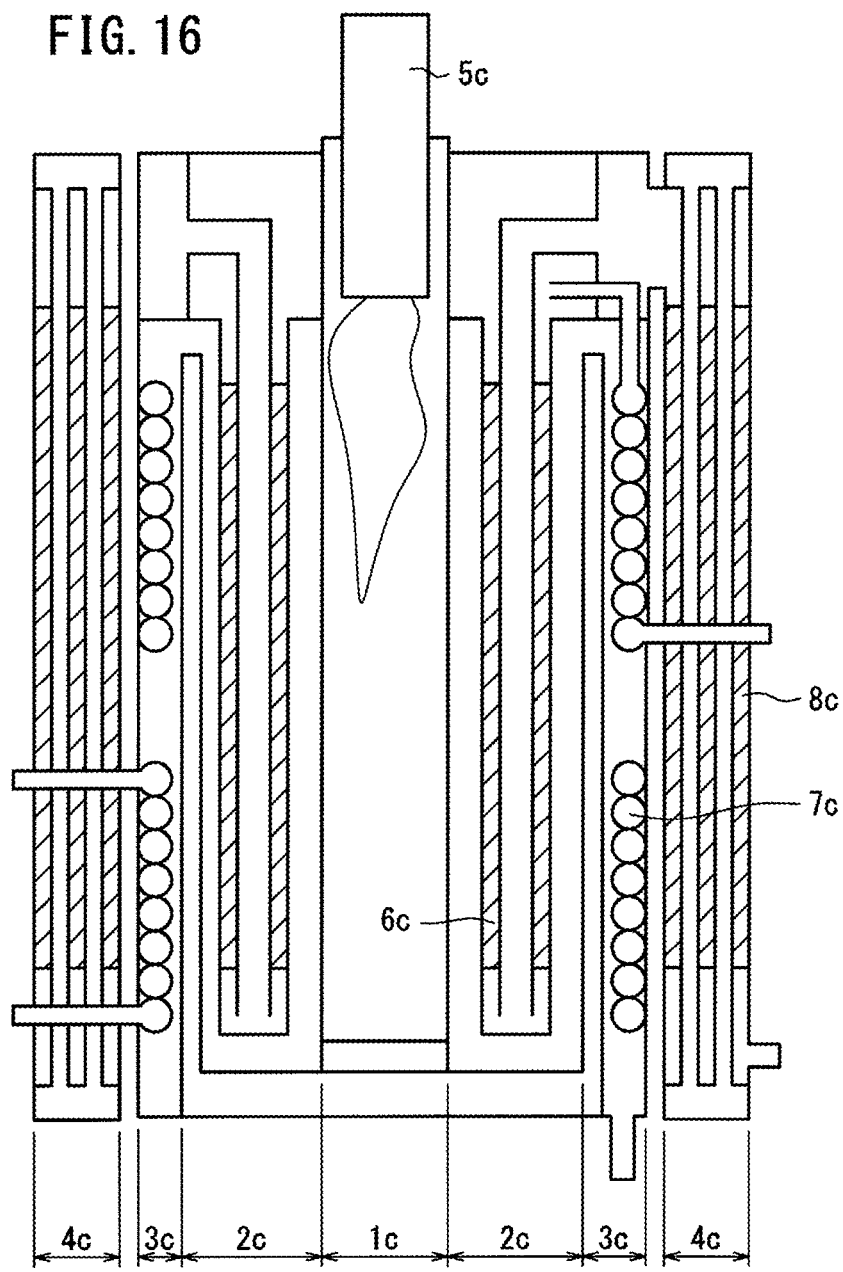
FIG. 16 is a view schematically showing a fuel cell system disclosed in the conventional technique 3.

A stress relaxing portion 160 shown in FIG. 13 is provided in an inner ring 162 and an outer ring 164. An inner curved portion 160ai and an outer curved portion 160ao of the stress relaxing portion 160 are provided in the inner circumferential portion and the outer circumferential portion of the inner ring 162. A plurality of, i.e., two inner curved portions 160ai and a plurality of, i.e., two outer curved portions 160ao are provided to have curves oriented oppositely to each other like a bellows.

An inner curved portion 160bi and an outer curved portion 160bo of the stress relaxing portion 160 are provided in the inner circumferential portion and the outer circumferential portion of the outer ring 164. A plurality of, i.e., two inner curved portions 160bi and a plurality of, i.e., two outer curved portions 160bo are provided to have curves oriented oppositely to each other like a bellows.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel containing hydrocarbon and water vapor to produce the fuel gas supplied to the fuel cell stack;
an evaporator for evaporating water, and supplying the water vapor to the reformer;
a heat exchanger for raising the temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the fuel cell module includes:
a first area where the exhaust gas combustor and the start-up combustor are provided;
an annular second area around the first area and where the reformer and the heat exchanger are provided; and
an annular third area around the second area and where the evaporator is provided,
and wherein a stress relaxing portion for relaxing heat stress is provided at least along a border between the first area and the second area, along a border between the second area and the third area, or along an outermost portion of the third area.

2. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber, and another end connected to the fuel gas discharge chamber, and a combustion gas channel for supplying the combustion gas between the reforming pipes;
the evaporator includes an annular water supply chamber to which the water is supplied, an annular water vapor discharge chamber to which the water vapor is discharged, a plurality of evaporation pipes each having one end connected to the water supply chamber, and another end connected to the water vapor discharge chamber, and a combustion gas channel for supplying the combustion gas between the evaporation pipes; and
the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber, and another end connected to the oxygen-containing gas discharge chamber, and a combustion gas channel for supplying the combustion gas between the heat exchange pipes.

3. The fuel cell module according to claim 2, wherein the fuel gas discharge chamber and the oxygen-containing gas discharge chamber are provided in a double deck manner, and the fuel gas discharge chamber is provided on an inner side with respect to the oxygen-containing gas discharge chamber in an axial direction; and
the mixed gas supply chamber and the oxygen-containing gas supply chamber are provided in a double deck manner, and the mixed gas supply chamber is provided on an inner side with respect to the oxygen-containing gas supply chamber in the axial direction.

4. The fuel cell module according to claim 2, wherein each of the mixed gas supply chamber and the fuel gas discharge chamber is formed between an inner ring into which ends of the reforming pipes are inserted and an outer ring spaced away from the inner ring;
each of the water supply chamber and the water vapor discharge chamber is formed between an inner ring into which ends of the evaporation pipes are inserted and an outer ring spaced away from the inner ring; and
each of the oxygen-containing gas supply chamber and the oxygen-containing gas discharge chamber is formed between an inner ring into which ends of the heat exchange pipes are inserted and an outer ring spaced away from the inner ring.

5. The fuel cell module according to claim 2, wherein the fuel gas discharge chamber, the oxygen-containing gas discharge chamber, and the water vapor discharge chamber are provided at one end adjacent to the fuel cell stack; and
the mixed gas supply chamber, the oxygen-containing gas supply chamber, and the water supply chamber are provided at the opposite end remote from the fuel cell stack.

6. The fuel cell module according to claim 4, wherein the stress relaxing portion is provided in the inner ring and the outer ring of at least one of the fuel gas discharge chamber, the oxygen-containing gas discharge chamber, and the water vapor discharge chamber.

7. The fuel cell module according to claim 4, wherein the stress relaxing portion is provided in the inner ring and the outer ring of at least one of the mixed gas supply chamber, the oxygen-containing gas supply chamber, and the water supply chamber.

8. The fuel cell module according to claim 4, wherein the stress relaxing portion is made of a curved portion provided in at least inner circumferential portions or outer circumferential portions of the inner ring and the outer ring.

9. The fuel cell module according to claim 1, wherein the fuel cell module is a solid oxide fuel cell module.

* * * * *